United States Patent [19]

Strohmeier et al.

[11] 3,916,745
[45] Nov. 4, 1975

[54] CUTTING ARRANGEMENT
[75] Inventors: Harald Strohmeier; Günter Müller, both of Kapfenberg, Austria
[73] Assignee: Vereinigte Edelstahlwerke AG, Vienna, Austria
[22] Filed: May 15, 1974
[21] Appl. No.: 470,297

[30] Foreign Application Priority Data
May 18, 1973 Austria .............................. 4352/73

[52] U.S. Cl. .................... 83/311; 83/315; 83/321; 83/328
[51] Int. Cl.² .................. B23D 25/02; B23D 25/06
[58] Field of Search ............. 83/315, 311, 321, 328

[56] References Cited
UNITED STATES PATENTS
1,505,711  8/1924  Johnson ....................... 83/315 UX
2,843,202  7/1958  Hallden ........................... 83/315 X

*Primary Examiner*—J. M. Meister

[57] ABSTRACT

A cutting device has a pair of pivotally connected members having knives affixed to their free ends. The pair of members move substantially reciprocally with respect to a continuously moving strand of material, such as wire, to be cut by said pair of knives. One of the pair of members extends beyond their pivot point and is connected via a first crank shaft to a first crank gear, at the side opposite the side having the ends with the knives, relative to the pivot point of the pair of members. Each member is also pivotally connected to a guide member which is arranged substantially normal to the feed direction of the strand of material. At least one of the two guide members is pivotally connected via a second crank shaft to a second crank gear. Gear means are provided to assure that the first and second crank gears rotate at the same speed.

3 Claims, 2 Drawing Figures

CUTTING ARRANGEMENT

The present invention relates to a cutting arrangement for cutting sections of equal length of a strand of material rapidly moving in a predetermined longitudinal direction. The arrangement is particularly suited for cutting wire sections of equal length by means of a pair of movable knives.

Cutting arrangements of the aforedescribed type must operate so that the actual cutting mechanism moves, at the instant the cutting operation is to be carried out, at the same speed and in the same direction as the strand of material that it to be cut is moving, so that sections of equal lengths of the strand of material may be cut. Thus, the two knives carrying out the cutting operation must, in addition to the cutting movement, also carry out a very fast reciprocal movement. In known constructions guide ways are provided for carrying out such a complex reciprocal movement. These guide ways are subjected to very high wear and despite rigorous and costly servicing such arrangements have to be replaced after a relatively short operating life.

It is a principle object of the present invention to provide a cutting arrangement for cutting a strand of material rapidly moving in a longitudinal direction. It is a more specific object of this invention to provide such an arrangement for cutting wire moving in a longitudinal direction by means of a pair of reciprocally moving knives. The aforedescribed drawbacks of the cutting arrangements of the prior art are avoided by means of the cutting arrangement of the present invention. Furthermore, the cutting arrangement of the present invention has a useful life that extends far beyond the useful lives of the conventional cutting arrangements of the aforedescribed types forming the state of the art.

The cutting arrangement of the present invention is particularly suitable to be incorporated into an arrangement usch as disclosed in our copending patent application Ser. No. 470,299 entitled PROCESS AND ARRANGEMENT FOR CONTINUOUS MANUFACTURE OF DRAWN STRAIGHT WIRE SECTIONS filed simultaneously with this application and having the same joint inventors.

The cutting arrangement of the present invention has a pair of pivotally connected members having knives affixed to their free ends. The two pivotally connected members act in the manner of a scissor thereby having their free ends move reciprocally towards and away from each other. One of the pair of members extend beyond the pivot point connection and this extension is connected via a first crank shaft to a first crank gear at the side opposite the side having the ends with the knives. The pair of members are pivotally connected to a pair of guide members. One of the guide members is connected to a second crank gear via a second crank shaft. This arrangement provides that the pair of members have a complex movement which includes a cutting motion component and a feed motion component. The first and second crank gears are connected by one or more gears so that they have the same rotational speed.

According to a further feature of the cutting device of this invention the position of the first crank shaft may be adjusted relative to the axis of the first crank gear. This adjustment feature is advantageously realized by connecting the first crank shaft by means of a rotatably adjustable disc which is eccentrically arranged with respect to the first crank gear.

With the above and related objects in view, this invention consists of the details of construction and combination of parts to be more fully understood from the following detailed description when read in conjunction with the accompanying drawings, in which.

Figure 1:
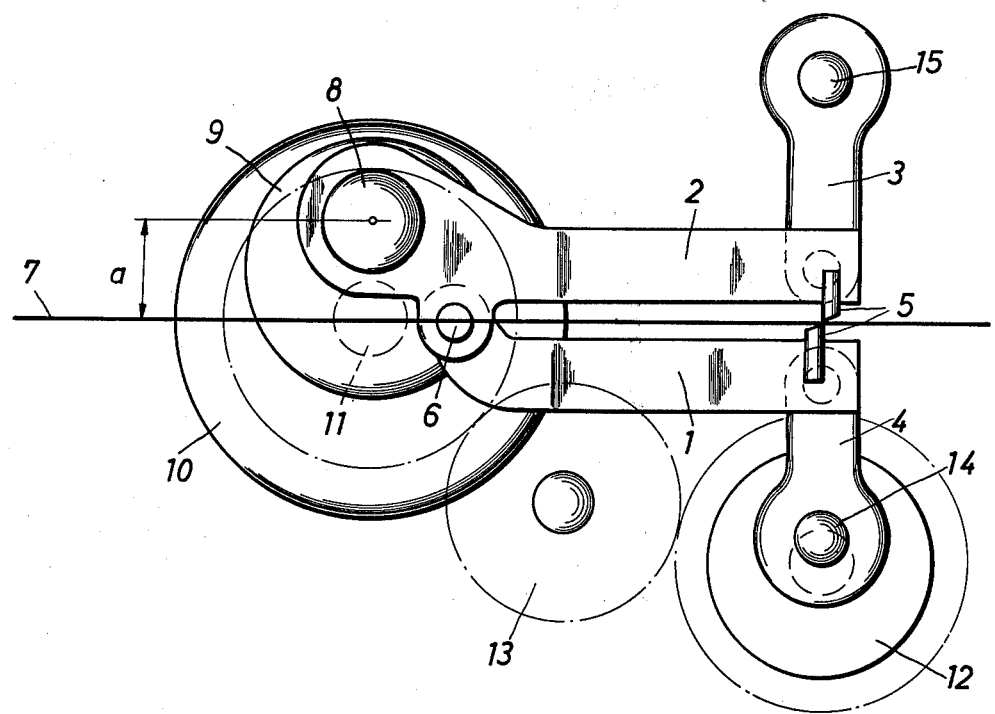
FIG. 1 is a side elevational view of the cutting device of the invention.
Figure 2:
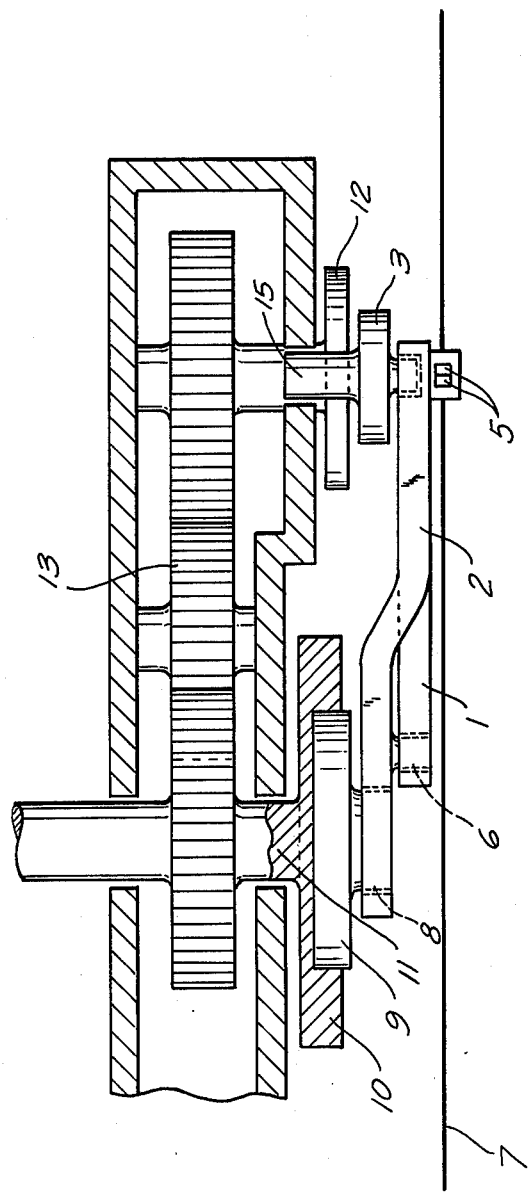
FIG. 2 is a plan view partially in section of the cutting device illustrated in FIG. 1.

Referring now to the drawing, the cutting arrangement serves to cut a straightened wire 7 moving at high velocity along a longitudinal direction. The wire must be cut exactly into wire sections of equal length. The cutting device includes a pair of levers 1 and 2 pivotally connected to each other by means of a pivot shaft 6. The pair of levers 1 and 2 have a pair of knives 5 affixed to their free ends. The upper lever 2 has an extension which is connected via a crank shaft 8 to a crank gear 10. The crank shaft 8 is rotatably mounted in the extension of the lever 2 as well as in a disc 9 in which it is rotatable and the disc 9 is eccentrically mounted relative to the axis of the crank gear 10 in a mating opening of the crank gear 10. By rotatably adjusting the disc 9 in the mating opening relative to the crank gear 10, the distance $a$ between the axis of the crank shaft 8 and the axis of the crank gear 10 can be infinitely variably adjusted to correspondingly vary the length of the wire section to be cut as indicated below. The disc 9 can be secured into the mating opening of the crank gear 10 by means of non-illustrated screws or toothed mating surfaces or any other conventional means for affixing two parts which are movable relative to each other. Each lever 1, 2 is pivotally connected to a guide member 3, 4 at the end having the knives 5. The guide members 3, 4 extend substantially normal to the feed direction of the wire 7. The lower guide member 4 is connected to a crank gear 12 via a crank shaft 14. The upper guide member 3 is connected via a pivot shaft 15 to a non-illustrated support structure. Both crank gears 10, 12 are driven with the aid of one or more gear wheels 13 so that they rotate with the same speed.

The members 1, 2 and knives 5 are shown in FIG. 1 at the instant the cutting operation is effected. After the cutting operation has been carried out, the lower knife 5 releases the path traversed by the wire 7 by moving downwardly; thereafter the lever 1 moves in the direction opposite to the feed direction of the wire 7 for a predetermined distance. This movement is necessary so that the lower lever 1 can carry out a cutting motion relative to the upper lever 2 which only moves reciprocally whereas the lower lever moves partially parallelly with respect to the wire 7. The cutting motion is controlled by the crank 12. The velocity of the levers 1, 2 carrying the knives 5 must correspond during the cutting operation to that of the feed velocity of the wire 7. The velocity of the levers 1, 2 is determined by the circumferential velocity of the crank shaft 8. Therefore the path traversed by the crank shaft 8 during one revolution must correspond in length to the length of the section to be cut. For example, if the distance $a$ in FIG. 1 is reduced by removing and reinserting and thereafter fixing the disc 9 in the adjusted position in the mating opening of the crank gear 10, a corresponding adjustment of the length of the crank shaft 8 and thereby also a shortening of the cut section of the wire strand is effected.

The cutting device of the present invention makes it possible that the feed velocity of the wire can be substantially increased. For example, in the production of coil wires for welding electrodes the arrangement of the present invention makes it possible to increase the feed speed by 15% in some cases even more.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. A cutting device for cutting sections of equal length of strand material and in particular wire continuously moving in a longitudinal path, comprising in combination, a pair of members pivotally connected to each other at one of their ends and each having knive means secured to the other free end, said pair of members being adapted to move in substantially parallel paths relative to the path of movement of said strand material;

one member having a portion extending from the pivot point of the pivotal connection between said pair of members away from the free end thereof;

a first crank gear rotatably mounted in said device;

a first crank shaft rotatably mounted in said crank gear and in said extending portion for operatively connecting them;

a pair of pivotable guide members mounted at opposite sides of said pair of members and extending substantially normal to the said longitudinal path of movement of the strand material, each guide member being pivotally connected at one of their ends to one of said members;

a second crank gear rotatably mounted in said device and operatively connected to said first crank gear so that both crank gears move at equal rotational speeds; and a second crank shaft rotatably mounted in one of said guide members, at a point distant from said pivotal connection with said member, and in said second crank gear for operatively connecting them.

2. A cutting device for cutting sections of equal length of strand material and in particular wire continuously moving in a longitudinal path, as set forth in claim 1, wherein the axis of said first crank shaft is adjustably positioned with respect to the axis of said first crank gear.

3. A cutting device for cutting sections of equal length of strand material and in particular wire continuously moving in a longitudinal path, as set forth in claim 2, wherein said first crank gear has a circular opening, a disc adjustably mounted in said opening, said first crank shaft being eccentrically rotatably mounted in said disc thereby operatively connecting said first crank gear to said extending portion.

* * * * *